Nov. 13, 1928.
A. M. DRAKE
1,691,649
CHUCK
Filed Jan. 22, 1926 2 Sheets-Sheet 2
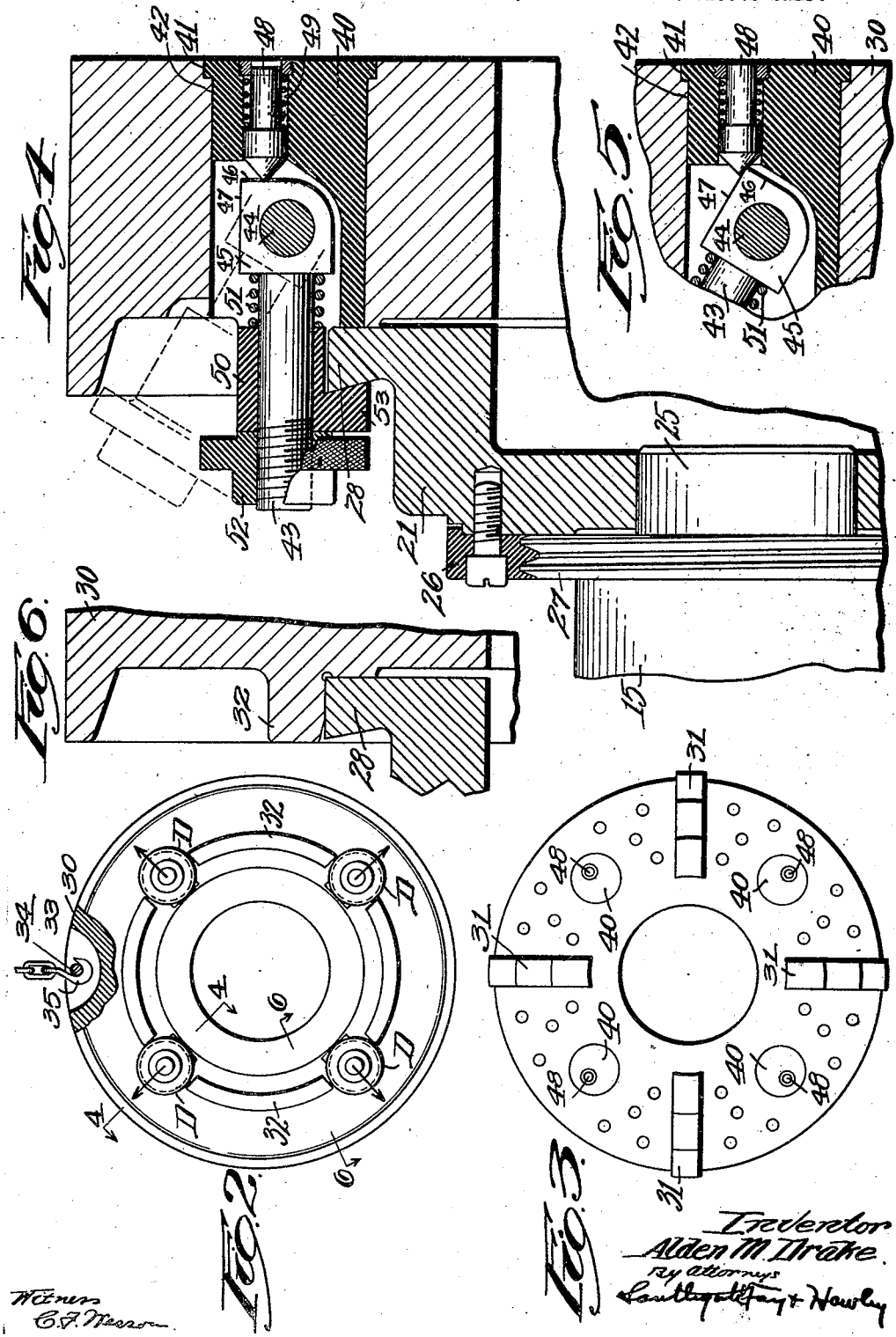

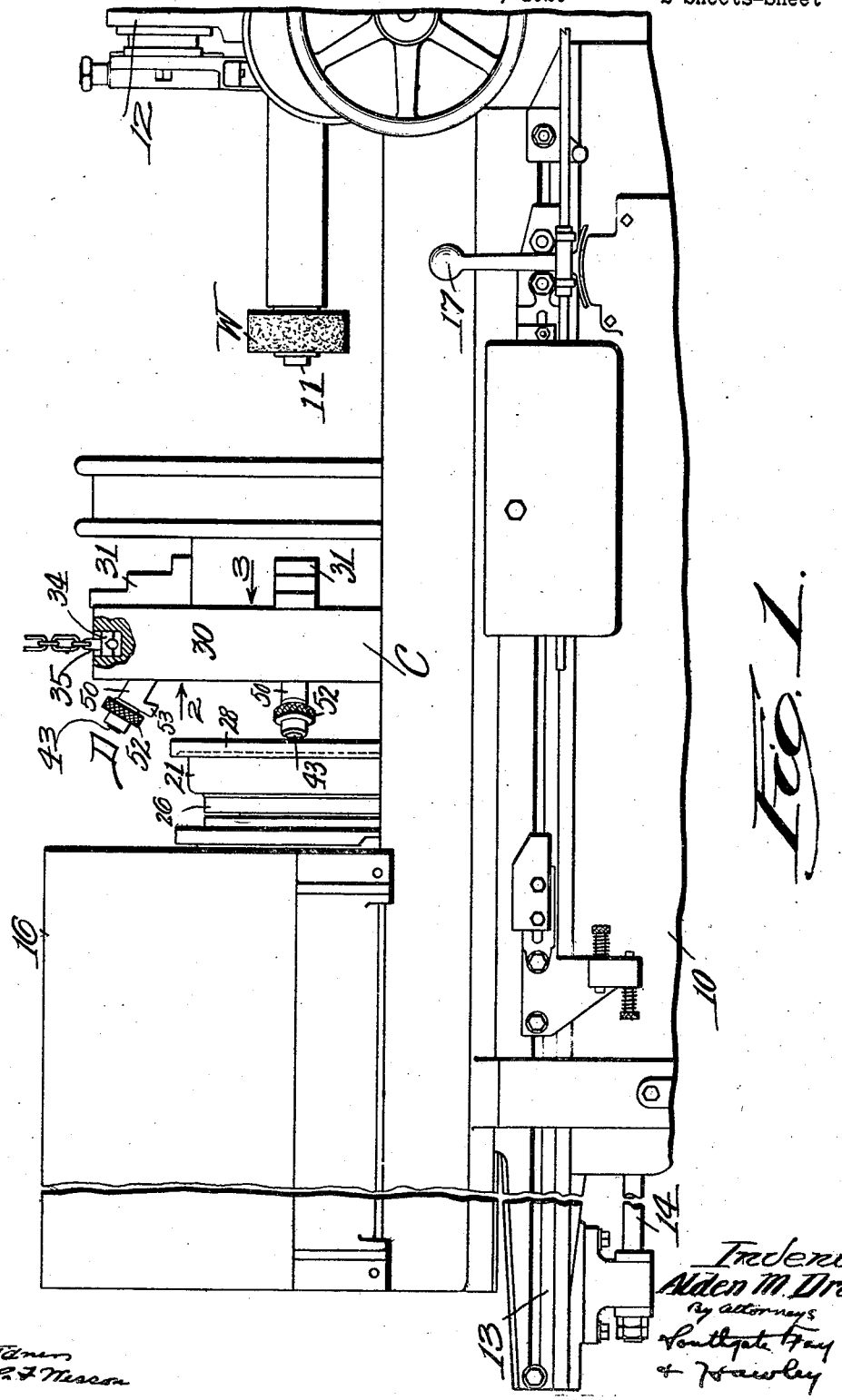

Patented Nov. 13, 1928.

1,691,649

UNITED STATES PATENT OFFICE.

ALDEN M. DRAKE, OF GREENFIELD, MASSACHUSETTS, ASSIGNOR TO GREENFIELD TAP AND DIE CORPORATION, OF GREENFIELD, MASSACHUSETTS, A CORPORATION OF MASSACHUSETTS.

CHUCK.

Application filed January 22, 1926. Serial No. 83,097.

This invention relates to means for holding work upon the spindle of a grinding machine, lathe, or other machine tool. In handling heavy work, it is sometimes desirable that the work should be secured in the chuck while the latter is removed from the machine, as it is frequently more convenient to secure the work in the chuck with the chuck in a horizontal position. The chuck and work are then moved to the machine by a chain hoist or other equivalent mechanism and the chuck is attached in working position on the spindle. It is obviously impossible to rotate the chuck while suspended from the hoist, so that the ordinary screw thread connection between the spindle and chuck is not satisfactory.

It is the object of my invention to provide an improved construction by which the chuck may be quickly and easily secured to the spindle and may be accurately centered thereon, even when suspended from a chain hoist and when having a heavy piece of work secured therein.

My invention further relates to arrangements and combinations of parts which will be hereinafter described and more particularly pointed out in the appended claims.

A preferred form of the invention is shown in the drawings in which—

Fig. 1 is a side elevation of portions of a grinding machine with my improved chuck about to be attached thereto;

Fig. 2 is an end elevation, partly in section, of my improved chuck, looking in the direction of the arrow 2 in Fig. 1;

Fig. 3 is an end elevation of the chuck, looking in the direction of the arrow 3 in Fig. 1;

Fig. 4 is an enlarged partial sectional view, taken along the line 4—4 in Fig. 2;

Fig. 5 is a detail view similar to Fig. 4 but showing certain parts in a different position; and Fig. 6 is a partial sectional view, taken along the line 6—6 in Fig. 2.

Referring to the drawings, I have shown parts of a grinding machine including a base or frame 10, a grinding wheel W mounted on a shaft 11, rotatable in a wheel head 12 mounted on the base 10, and a work table 13 slidable on the base and movable by a piston rod 14 from suitable hydraulic or other actuating devices. A work spindle 15 (Fig. 4) is rotatable in a head or casing 16 (Fig. 1) mounted on the table 13 and provided with a suitable driving mechanism (not shown). The work table 13 is automatically reciprocated in the usual manner and the movement thereof may be manually controlled by a handle 17.

All of the parts thus far described may be of the usual form and in themselves constitute no part of my present invention which relates particularly to a chuck C and to improved means for securing the same upon the spindle 15.

The spindle is preferably provided with a face plate 21 (Fig. 4) centered upon a plug or projection 25 of the spindle 15. A threaded ring 26 is secured to the rear face of the face plate 21 and engages a threaded flange 27 on the end of the spindle 15. The face plate 21 is thus accurately centered upon the end of the spindle and firmly secured thereto. The face plate 21 is provided with an outwardly extending undercut flange 28 for a purpose to be described.

The chuck C comprises a body 30 having jaws 31 radially slidable therein to engage and center the work. Any usual operating mechanism (not shown) may be provided for simultaneously or independently moving the different jaws.

On its rear face the chuck is provided with a circular flange or rib 32 (Fig. 6) which is accurately finished on its inner periphery to fit closely over the flange 28 of the face plate 21. The inner edge of the flange 32 is preferably bevelled slightly to facilitate centering of the chuck upon the flange 28.

A recess 33 (Fig. 2) may be formed in one portion of the body 30 and a stud 34 passing through the recess forms a convenient point of attachment for a hook 35 connected to a chain hoist or other equivalent mechanism.

I have also provided clamping devices D for securing the chuck upon the flanged face plate 21. One of these clamping devices is shown in detail in Fig. 4 and comprises a cylindrical member 40 having a flange 41 at one end thereof and adapted to be driven into an opening 42 in the chuck body 30. The member 40 is preferably a drive fit in the opening 42 but additional devices may be provided for securing the member 40 in position.

A threaded stud 43 is pivoted on a pin 44 extending cross-wise in the member 40. The stud 43 is also provided with a head 45 at its pivoted end having faces 46 and 47 for engagement by a spring plunger 48 mounted in an opening 49 in the member 40. When the plunger engages the face 46, it acts to hold the stud in the operative position shown in Fig. 4, and when it engages the face 47 as shown in Fig. 5, it holds the stud yieldingly in inoperative position.

A collar 50 is slidably mounted on the stud 43 and is yieldingly thrust outward by a spring 51 against a clamping nut 52. The collar 50 has an undercut offset or projection 53 on one side thereof adapted to engage the undercut face of the flange 28 on the face plate 21. When the chuck is to be removed from the machine, the attaching devices D are swung outward as indicated in Fig. 1 and are yieldingly retained in outward position by the plunger 48 as shown in Fig. 5. The chuck is then loaded and is swung into position in front of the face plate 21, upon which it may be centered by a straight axial movement.

The clamping devices D are then swung downward to the position indicated in full lines in Fig. 4 and the clamping nuts 52 are tightened to force the offset projections 53 of the collars 50 against the undercut flange 28 of the face plate 21. The chuck is thus quickly and easily secured to the face plate 21 on the spindle 15 and is accurately centered thereon. Reference to Fig. 2 will show that the flange 32 on the chuck is cut away at the points where the attaching devices D are located.

Having thus described my invention and the advantages thereof, I do not wish to be limited to the details herein disclosed otherwise than as set forth in the claims, but what I claim is:

1. In a machine tool chuck supporting and attaching means comprising, a work spindle having a face plate, a detachable work holding chuck having a recess to receive said face plate, and means to secure said chuck to said face plate, said face plate having a continuous circular flanged edge portion and said chuck having spaced clamping devices effective to engage any circumferential part of said edge portion and to secure said chuck firmly to said spindle in any angular relation relative thereto.

2. In a machine tool chuck supporting and attaching means comprising, a work spindle having a face plate, a detachable work holding chuck, said chuck and face plate having parts cooperative to center said chuck, and means to secure said chuck to said face plate, said face plate having an outwardly projecting continuous circular edge portion, and said chuck having clamping devices pivoted thereto at spaced points thereon and movable into position to engage any circumferential part of said projecting edge portion of said face plate in any circumferential angular relation of said chuck and face plate, and said clamping device having means to exert pressure against said projecting portion to secure said chuck firmly on said spindle.

3. In a machine tool chuck supporting and attaching means comprising, a work spindle having a face plate, a detachable work holding chuck, said chuck and face plate having parts cooperative to center said chuck, and means to secure said chuck to said face plate, said face plate having an outwardly projecting edge portion and said chuck having clamping devices pivoted thereto at spaced points thereon, said clamping devices being movable on their pivots to operative and inoperative positions relative to said projecting portion of the face plate, and means to hold said clamping devices in inoperative position.

4. In a machine tool chuck supporting and attaching means comprising, a work spindle having a face plate, a detachable work holding chuck, said chuck and face plate having parts cooperative to center said chuck, and means to secure said chuck to said face plate, said face plate having an outwardly projecting edge portion and said chuck having clamping devices pivoted thereto at spaced points thereon, said clamping devices being movable on their pivots to operative and inoperative positions relative to said projecting portion of the face plate, and yielding means to hold said clamping devices in inoperative position but permitting manual movement thereof to operative position.

5. In a machine tool chuck supporting and attaching means comprising, a work spindle having a face plate, a detachable work holding chuck, said chuck and face plate having parts cooperative to center said chuck, and means to secure said chuck to said face plate, said face plate having an undercut flanged portion and said securing means comprising rearwardly projecting studs in said chuck, collars on said studs each having an undercut lateral projection, and nuts threaded on said studs and effective to draw said projections against said undercut flange portion of said face plate.

In testimony whereof I have hereunto affixed my signature.

ALDEN M. DRAKE.